March 5, 1968   R. MAUGUÉ   3,372,390

DOPPLER RADAR SYSTEMS

Filed Dec. 14, 1966   3 Sheets-Sheet 1

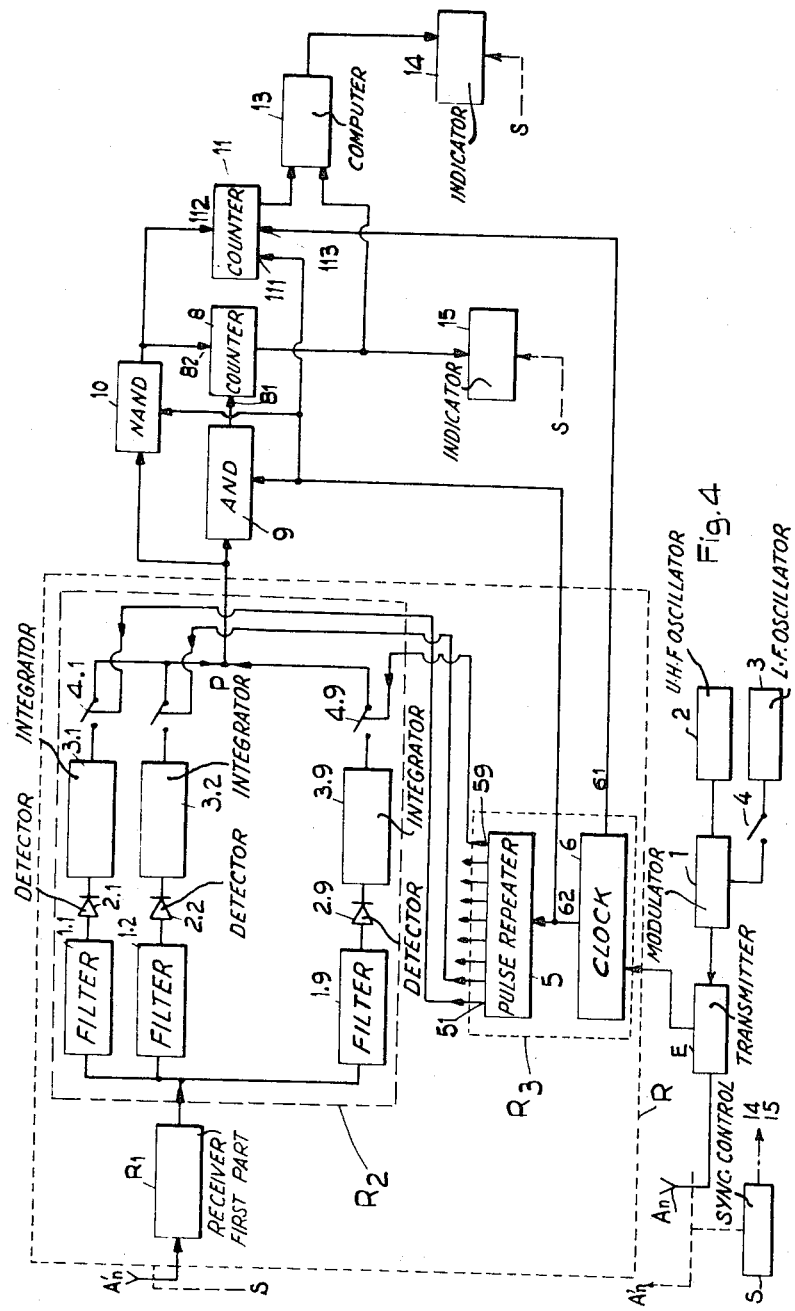

United States Patent Office 3,372,390
Patented Mar. 5, 1968

3,372,390
DOPPLER RADAR SYSTEMS
Richard Maugué, Paris, France, assignor to CSF—Compagnie Generale de Telegraphie Sans Fil, a corporation of France
Filed Dec. 14, 1966, Ser. No. 601,781
Claims priority, application France, Dec. 17, 1965, 42,678, Patent 1,467,244
5 Claims. (Cl. 343—9)

ABSTRACT OF THE DISCLOSURE

The distance of a target to a surveillance Doppler radar system is measured, without stopping the surveillance, through sinusoidally frequency modulating the transmitted wave and evaluating the length of the spot supplied by the echo on a conventional velocity bearing indicator.

---

The present invention relates to electromagnetic detection systems used for the surveillance of the space, both of the pulse or continuous wave type, in which the desired information is the speed which is generally represented on a screen by the ordinate of a luminous point whose abscissa indicates the bearing of the corresponding target. Known distance measuring methods used in such devices have the drawback of necessitating an appreciable measuring time during which the system cannot be used for space surveillance purposes, since the beam of the antenna must remain stationary during the measurement.

This drawback becomes very serious if there are many obstacles or targets present; in fact, considering that it takes two seconds to make a precise distance measurement, the measuring time in the presence of twenty targets will be forty seconds. In view of the speed of modern aircraft, the situation can change quite considerably during this time and a target can be found to be dangerous before there has been any time to locate it.

It is an object of this invention to avoid this drawback.

According to this invention there is provided a method for approximately measuring the distance of an obstacle to a surveillance Doppler radar system without stopping the surveillance performed by said radar, said method comprising the steps of sinusoidally frequency modulating the signal transmitted by said radar, transmitting said modulated signal, receiving said signal as an echo reflected by said obstacle and displayed as a spot on the indicator of said system, and evaluating the length of said spot.

An accurate measurement of the distance to the targets can be carried out later, if necessary, by known means; the order of priority of accurate measurements to be effected, having been indicated by the rapid approximate measurement according to the invention, the most dangerous target will be pointed out early enough.

For a better understanding of the invention and to show how the same may be carried into effect, reference will be made to the drawing accompanying the following description and in which:

FIG. 4 is the basic diagram of a Doppler radar station according to the invention, equipped with a computer.

Figure 1:
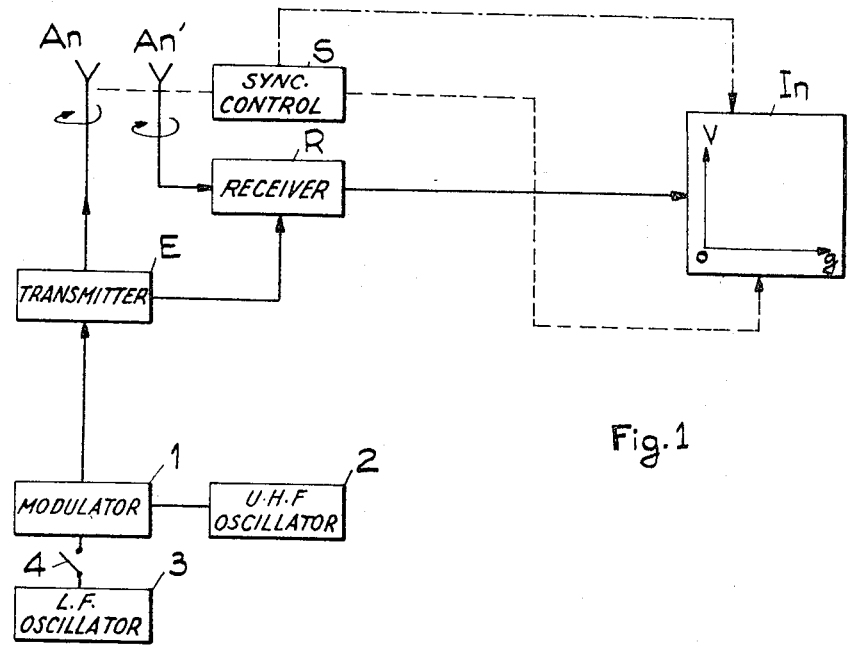
FIG. 1 is a basic diagram of a Doppler radar system, improved according to the invention and equipped with an oscilloscope-type indicator.

The radar station shown in FIG. 1 comprises essentially a modulator 1 fed continuously by a quartz stabilized ultra-high frequency oscillator 2, and whose modulation input receives the low frequency sinusoidal wave, for example, at 60 c./s., from an oscillator 3 through a switch 4. The control of the latter will be described further below.

The output of the modulator is coupled to the actual transmission block E. The latter comprises, as known in the art, conventional frequency changing stages and ultra-high frequency amplifying stages, and possibly pulse modulation stages, if the system is of the pulse Doppler type. These circuits are known per se and will not be described any further.

The receiver block R comprises, as known in the art, a frequency changing and frequency amplifying stage, and a frequency analyzing device, for example, a group of narrow and adjacent band pass filters, the assembly of filters covering the band of used Doppler frequencies, or a "pulse compression" arrangement, in which the received signal is frequency translated through mixing with a frequency modulated reference oscillation and, then, compressed in a matched compression filter.

The transmitter E and the receiver R are connected to antennae An and An', respectively.

Naturally, in the case of a pulse-type Doppler radar, a single antenna can be used; it is connected to the transmitter and to the receiver through a duplexer, for example, or in any known manner ensuring the correct dispatching of the transmission and reception signals.

The synchronized scanning of the space by the beams radiated by the antennae An and An' is ensured by a scanning control device S of mechanical or electronic type, according to the nature of the antennae and the manner in which the scanning is performed. In all cases, the scanning along the bearing axis Og of the beam of the oscilloscopic indicator In is effected in synchronization with the space scanning, as indicated by the symbolic link between S and In.

The scanning along the axis of ordinates or axis of speeds Ov is effected, as known, in synchronization with the analysis of the output voltages of the frequency analyzing filters of the receiver, in the case of a receiver comprising a set of filters. In the case of a frequency analysis by mixing and compression, the speed-time conversion is effected by the analyzer arrangement itself and the vertical screen scanning needs only to be synchronized at the starting.

When the radar functions only for "surveillance," the switch 4 is open and the installation and its operation are identical to those of a conventional Doppler radar. A target with the bearing g and the speed v gives rise on the screen of the indicator to a luminous point with the abscissa g and the ordinate v, as shown in FIG. 2.

When the approximate distance of a target is to be known, the operator closes the switch 4.

In the case of a radar mounted on board an aircraft, where the scanning of the space takes place very rapidly, it might be of interest to reduce at the same time the explored angular sector. This can be made by known means, such as, for example, setting a movable vertical index on the mean bearing of the sector to be explored.

This facultative reduction is obtained simply. It is shown symbolically by the connection in dash-dot line between the indicator and the scanning control device. Still, the reduced sector will be sufficiently wide (30°, for example) to assure correct space surveillance.

Finally, the displacement of the index or alidade can control automatically the closure of the switch.

Figure 2A:
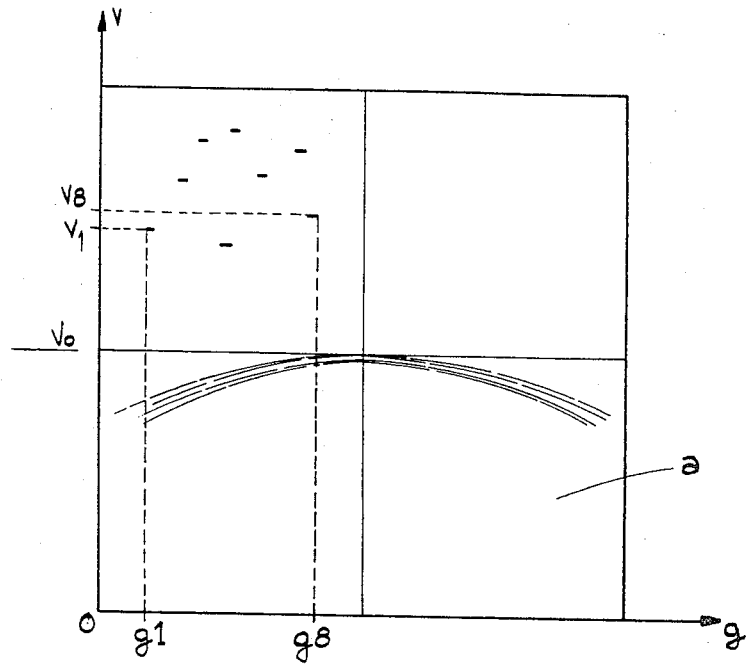
FIGS. 2a and 2b show the aspects of the indicator of the radar station of FIG. 1 for two different phases of the operation of the radar station.
Figure 2B:
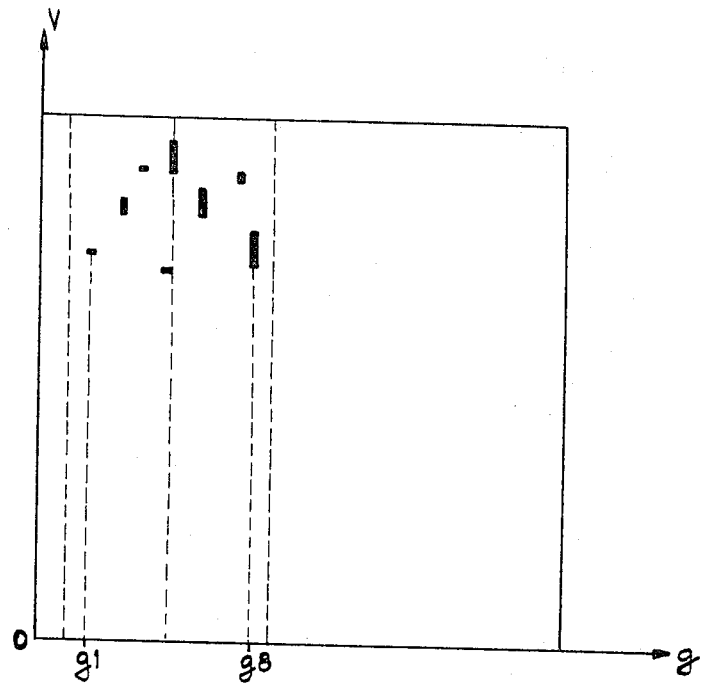

The frequency of the ultra-high frequency oscillation supplied by the oscillator 2 is then sinusoidally modulated and the echo from a target causes then the illumination, no longer of a point, but of several adjacent points giving the impression of a vertical luminous line, such as shown in FIG. 2b. The number of points, that is to say, the length of the line is indicative of the distance of the target. In the case of a "compression" type receiver, an actual line is obtained. An accurate measurement of the distance, if necessary, can be carried out afterward by conventional means.

Anyway, since the accurate measurement, if any, takes place after the approximate position of all the targets has been indicated, the absence of space surveillance during the accurate measurement is no longer critical.

FIGS. 2a and 2b show the screen of the indicator In, first during the phase wherein only space conventional surveillance, takes place, and then during the surveillance with distance measurement.

The zone a is a zone contaminated with ground echoes and the speed $vo$ represents the maximum speed of the ground echoes. In the case shown here, eight targets with the respective bearings $gi$ ($i=1$ to 8) and respective speeds $vi$ are assumed to be detected. Only $g1$, $g8$, $v1$, $v8$ are shown, in order not to overload the drawing. If necessary, the operator places the index on the main bearing, that is, about $g5$.

The surveillance is in this case restricted to the zone defined by the two vertical lines (broken lines) and the luminous points located within this zone become vertical lines, proportional to the distance of the corresponding targets, as shown in FIG. 2b, in the course of the corresponding scanning. It may be seen from this example that the nearest targets correspond to the bearings $g1$, $g3$, $g4$. The targets corresponding to the bearings $g1$ to $g8$ are located at the approximate distances of 10 km., 50 km., 10 km., 10 km., 100 km., 75 km., 20 km., 100 km.

Figure 3:
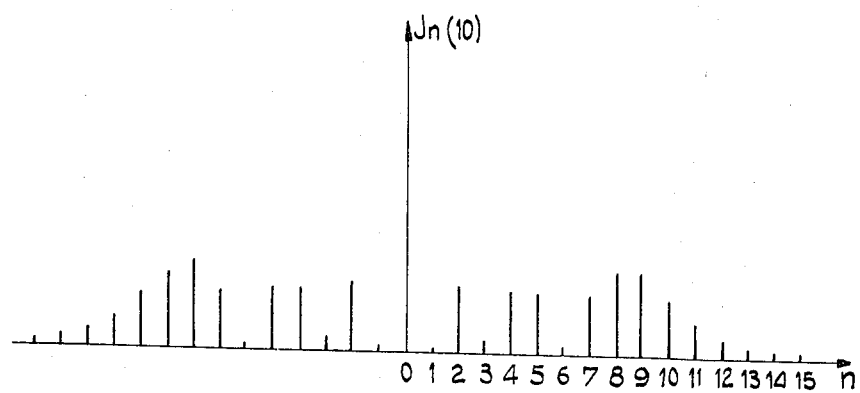
FIG. 3 is an explanatory diagram enabling the principle of the invention to be better understood.

FIG. 3 is an explicative diagram.

It is recalled that during the general "surveillance" operation, that is, while the radar operates as a conventional Doppler radar, with the switch 4 open, a target with the speed $v$ gives rise to a voltage at the output of only one of the filters of the frequency analyzing equipment. The ordinate of this point, representing the target, is a function of the rank of this filter.

When the switch 4 is closed, and in view of the fact that the modulating wave is sinusoidal, the frequency of the beat wave between the transmitted wave and the received wave is:

$$f = fi + fd + \Delta F \omega_m \cos \omega_m \left(t - \frac{\tau}{2}\right)$$

where $fi$ is the intermediate frequency of the receiver
$fd$ is the Doppler frequency of the target
$\Delta F$ is the maximum frequency excursion of the transmission wave $$\tau = 2\frac{D}{c}$$

in which D is the distance of the target and $c$ the light velocity
$t$ is the variable "time"
$\omega m$ is the pulsation of the modulating wave with the frequency $fm$ (equal to 60 c./s. in the example described hereinbefore).

The spectrum of the received wave is a spectrum of lines whose values are given by the Bessel functions $Jn(M)$, where M, the modulation index of the received wave, is equal to $2\pi.\Delta F\tau$. This spectrum is shown in FIG. 3 for $M=10$; the rank of the line, $n$, being shown as abscissa and the function $Jn(10)$ as ordinate.

It may be seen that it comprises linos spaced from each other by $fm$ and whose amplitudes are of the same order of magnitude as long as the number of the lino, $n$, is lower than the modulation index ($n \leqslant M$). For $n > M$, the amplitude of these linos drops very rapidly, because each is lower than half the preceding one and therefore the attenuation in the energy level of the lines is over 6 db per line, outside the zone where $n < M$ is.

It is this property, which is used in the radar system according to the invention, for illuminating the screen of the oscilloscope with echo spots whose lengths are proportional to the distances between the radar set and the targets from which they originate. In fact, due to the modulation, an echo excites no longer a single filter, but a certain number as a function of M. M being proportional to the distance, the number of points appearing adjacently vertically on the screen, and therefore the length of the line in the vertical direction represent the distance.

This is another advantage of the invention—the first being that the measurement of the distance is instantaneous—namely to display directly on the screen an indication of the distance without any modification of the receiver and indicator.

In an airborne radar system, the frequency modulation of the transmitted wave will be chosen so as not to widen excessively the ground returns, which originate from the main lobe of the antenna.

This widening is equal to $\Delta F.\omega m.\tau$ which results, for ground returns located at a distance of 75 km., and if this widening is limited to 1000 c./s. in:

$$\Delta F \omega_m = \frac{1000}{\tau} = \frac{1000}{\frac{2 \times 75.10^3}{3.10^8}} = 2 \times 10^6$$

For example, by chosing $fm = 60$ c./s., one obtains:

$$\Delta F = \frac{2.10^6}{2\pi 60} = 5400 \text{ c/s}$$

and by taking $F=5$ kc./s., the number of Doppler filters with the band width $B=400$ c./s., for example, which will be excited by the signal is:

$$\frac{2M \times fm}{B}$$

which gives for different distances:

| Distance of the target (km.) | 10 | 25 | 50 | 75 | 100 |
|---|---|---|---|---|---|
| Modulation index of the wave at reception | 2.1 | 5.2 | 10.5 | 16 | 21 |
| Number of excited Doppler filters | 1 | 2 | 3 | 4 | 5 |

The spreading of the spectrum of the echoes over several filters is accompanied by a lowering in the signal level of each of them. This lowering will in part be compensated by the increase of the time interval during which the beam sweeps the targets, due to the narrowing of the sector to be covered.

Thus, the distance measurement is made under satisfactory conditions.

This method has the advantage of giving measurements which are practically independent of the echo level, owing to the rapid drop of the spectrum at the edges (more than 6 db per line).

On the other hand it has the drawback of giving a quantified measurement, the step of which depends on the band width of the Doppler filters; in the example hereinbefore given, this step amounts to 16 km.

If the number of filters is multiplied by two, this step drops to 8 km.

This quantification step can also be reduced by taking a higher modulation index, or by using for the analysis of the frequency a device of the pulse compression type, with a high compression rate.

Finally, it is obviously always possible to make a more precise measurement with the drawbacks outlined above in this specification, by using conventional methods, for example, according to the method described in the applicant's copending patent application Ser. No. 595,454, filed Nov. 18, 1966.

The instantaneous approximate distance measurement according to the invention can also be effected in a digital computer supplied with the frequency analysis device output, either in parallel with the screen or not, which screen might possibly be suppressed. In the latter case, the computer also supplies the speed of the targets.

The computer has the advantage of supplying information which can be directly utilized by the on-board computer.

FIG. 4 is an example of a radar system according to the invention, comprising a distance computer.

The receiver R is shown in greater detail to explain more clearly its coupling to the computer according to the invention, whilst its coupling to the oscilloscope type indicator is entirely conventional.

The receiver R comprises a first part $R_1$ including amplifying, mixing and frequency changing stages, a second part $R_2$, supplied with the output signal of $R_1$ and comprising essentially a frequency analyzing device, and a third part $R_3$, for reading out or scanning the results of the frequency analysis. The frequency analyzer comprises, for example, a set of filters, shown in the drawing at $1.i$ with $i=1$ to $p$, $p$ being the total number of filters. For the sake of clarity, $p$ has been limited to $p=9$, although the number of filters really used will generally be much higher.

Each filter $1.i$ is followed by a detector, $2.i$ and an integrator circuit $3.i$, for example a resistor-capacitor circuit. The terminals of these circuits are connected respectively to the first terminals of controlled switches $4.i$, whose second terminals have a common point P. The read-out device $R_3$ comprises a clock signal generator 6, supplying continously at its output 62 cyclic pulses to a distributor or pulse repeater 5 which distributes them successively to its outputs $5.i$, coupled, respectively, to the control terminals of the switches $4.i$. The generator 6 supplies also a zero resetting pulse at its output 61.

The computer according to the invention comprises a first counter 8 which advances step by step under the control of the clock output pulses at 62 which are applied to its input 81 across an electronic AND-gate 9, which is normally closed, and whose control input is connected to the common point P. The counter 8 is connected to a distance indicator 15 which may also be connected to the scanning device S. A normally open electronic gate or anti-coincidence circuit 10 has a signal input and a control input connected in parallel, respectively, to the signal and control inputs of the AND-gate 9. The output of the gate 10 is connected to the input 82 of the counter 8.

The pulses applied to this input cause simultaneously the read-out of the counter, for example its displaying at 15, and its resetting at zero. The display at 15 may be effected in a form which can be used directly by the on board computer.

A counter 11 advances step by step under the control of the pulses from the output 62 applied to its input 111; its non-destructive read-out is effected at the same time as the resetting to zero of the counter 8, by the output pulses of the gate 10, which is connected to the input 112 of the counter 11. The counter 11 is reset at zero with each scanning cycle of the filter by means of the pulses from the output 61 of clock 6, which are applied to its reset input 113.

This read-out is effected in the arithmetic computer 13 which also receives the read-out information from the counter 8 and is connected on the other hand to a speed indicator 14.

Naturally, the indicators 14, 15 can be replaced or coupled in parallel to any other known device for working out the information supplied by computer 13 and counter 14.

The operation of the computer is as follows:

The counter 8, of the type in which the resetting to zero is effected with destructive read-out, is at zero at the start. The advancing pulses of the counter, coming from clock 62, are blocked at 9 as long as no signal appears at P and are fed to counter 8 each time when a pulse from 62 causes the closing of a switch $4.i$ at an energized output of a filter. Once the counter 8 has been started, it stops only when a pulse from device 5 closes a switch located at a non-energized output of a filter. The counter 8 returns then to zero after having counted the number of adjacent filters suppling an output signal, which number is proportional to the distance of the target, as explained hereinbefore.

On the other hand, the counter 11 is of the type in which the read-out is effected without resetting at zero, the resetting being effected at the start and end of each scanning cycle of the clock 6 by the pulses coming from the output 61 of the latter. Thus, the counter advances by one step every time a filter is analyzed, regardless whether the output of the filter is energized or not, and the number it records is read-out and fed to one input of computer 13 every time the counter 8 is reset at zero, that is to say, the number read-out in the counter 11 is equal to the rank of the last energized filter plus one unit.

If this rank is $n$, and $x$ is the total number of lines for a target, $x$ is supplied by the counter 8 to the indicator 15 and to the second input of the calculator 13 and $n+1$ to the first input of the latter. The numerical calculator 13 carries out the operation $$y = \frac{n + (n+1-x)}{2} = n - \frac{x-1}{2}$$

$y$ is the rank of the centre filter of an assembly of $x$ adjacent energized filters of which the last one has the rank $n$; $y$ represents therefore the speed of the target.

Naturally, the computing circuit described above may be replaced by any known computation circuit known which permits the measurement of $x$ and $n$ from frequency analyzing pulses.

The circuit described can be used with the frequency analysis device by means of compression filters only, as mentioned above. In this case, the devices 5 and 6 are replaced by the internal time base of the radar, and voltage integrators may be used as devices 8 and 11. In this case, device 8 supplies a voltage proportional to the time during which the output of the analyzer is energized, and device 11 a voltage proportional to the time interval between the start of the analysis and the end of the output signal of the analyzer. These two voltages are fed to computer 13 which supplies the velocity indicator while the first voltage supplies the distance indication.

The invention is obviously not limited to the embodiment described above and shown merely by way of non-limitative example. Especially the nature of the gate circuits has not been specified, as well as the counter, arithmetic calculator, which parts can be realized in many ways known in the art.

What is claimed is:

1. A method for approximately measuring the distance of an obstacle to a surveillance Doppler radar system without stopping the surveillance performed by said radar, said method comprising the steps of sinusoidally frequency modulating the signal transmitted by said radar, transmitting said modulated signal, receiving said signal as an echo reflected by said obstacle and displayed as a spot on the indicator of said system, and evaluating the length of said spot.

2. A Doppler radar system comprising, in combination, a modulated Doppler radar system transmitter, including means for radiating sinusoidally frequency modulated signals, a non-modulated Doppler radar system receiver for receiving said signals as echoes from obstacles, said receiver including frequency analyzing means and a velocity-bearing indicator wherein said echoes are displayed as luminous spots, for the evaluation of the length thereof.

3. A Doppler radar system as claimed in claim 2, further comprising, in parallel with said indicator, computing means for supplying the velocity of said obstacles and their distance from said radar system.

4. A Doppler radar system as claimed in claim 2, wherein, said receiver including an arrangement of $n$ adjacent analysis filters, numbered 1 to $n$, where $n$ is an integer greater than one, said computing means comprises a first circuit having an output, determining the number $p$, where $p$ is an integer at most equal to $n$, of said filters which are energized upon reflection of said echo, a second circuit having an output determining the rank K of the last energized filter, where $p \leq K \leq n$, a first computer coupled to said first circuit output supplying the distance of said obstacle from said radar system as a function of $p$, and a second computer, coupled to said first and second circuit outputs, supplying the velocity of said obstacle relative to said radar system as a function of $p$ and K.

5. A frequency modulated Doppler radar system comprising: synchronization means; means for scanning a space portion with a sinusoidally frequency modulated beam; receiver means for receiving said beam as echoes reflected by obstacles; frequency analyzing means, having a synchronization input coupled to said synchronization means, a signal input coupled to said receiver means, and a signal output; a first circuit having an input coupled to said signal output, and an output supplying a first signal which is indicative of the time interval during which said signal output is energized; a second circuit having a synchronization input coupled to said synchronization means, an input coupled to said signal output, and an output supplying a signal which is a function of the time elapsed between the instant at which a sync pulse has been applied to said second circuit and the instant the energization of said signal output is cut off; first computing means having a signal input coupled to said first circuit output and supplying a distance indication; and second computing means having two inputs respectively coupled to said first and second circuits outputs, and supplying a velocity indication.

References Cited

UNITED STATES PATENTS 2,516,343  7/1950  Roberts _____ 343—9

RODNEY D. BENNETT, *Primary Examiner.*

RICHARD A. FARLEY, *Examiner.*

C. L. WHITMAN, *Assistant Examiner.*